United States Patent [19]
Joseph et al.

[11] Patent Number: 5,797,611
[45] Date of Patent: Aug. 25, 1998

[54] CART INCLUDING A FRAME MOUNTED ON CASTORS AND A CASTOR IN PARTICULAR FOR A CART OF THIS KIND

[75] Inventors: Alice Joseph, Schiltigheim; Alain Le Marchand, Reichstett, both of France

[73] Assignee: Ateliers Reunis Caddie, France

[21] Appl. No.: 691,067

[22] Filed: Aug. 1, 1996

[30] Foreign Application Priority Data

Sep. 1, 1995 [FR] France .................................. 95 10310

[51] Int. Cl.⁶ .................................................. B62D 39/00
[52] U.S. Cl. .................................. 280/33.991; 16/18 R
[58] Field of Search ...................... 280/33.991; 16/18 R, 16/36, 44

[56] References Cited

U.S. PATENT DOCUMENTS

| | | |
|---|---|---|
| 3,828,392 | 8/1974 | Bolger .................................. 16/35 |
| 4,494,272 | 1/1985 | Morita .................................. 16/35 R |
| 5,199,728 | 4/1993 | Hutchinson ........................ 280/33.992 |
| 5,263,266 | 11/1993 | Schmidt . |

*Primary Examiner*—Brian L. Johnson
*Assistant Examiner*—Jonathan E. Butts
*Attorney, Agent, or Firm*—Pennie & Edmonds LLP

[57] ABSTRACT

A cart includes a frame mounted on castors, at least two castors being provided at a first end of the cart on respective opposite sides of a mean longitudinal axis of the cart. Each castor at this first end includes a device for locking the castor against pivoting acting unidirectionally to allow the castor to pivot freely in one direction by a sufficient amount and to prevent it from pivoting in the opposite direction. The two castors at the first end of the cart on opposite sides of the mean longitudinal axis of the cart have opposite locking directions.

14 Claims, 1 Drawing Sheet

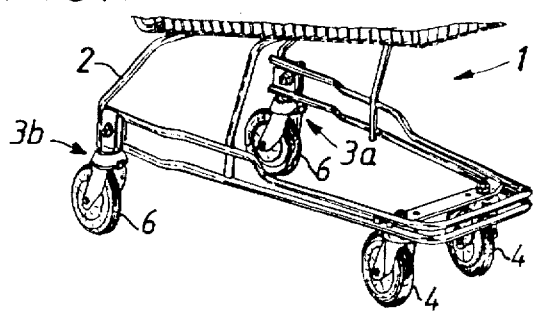
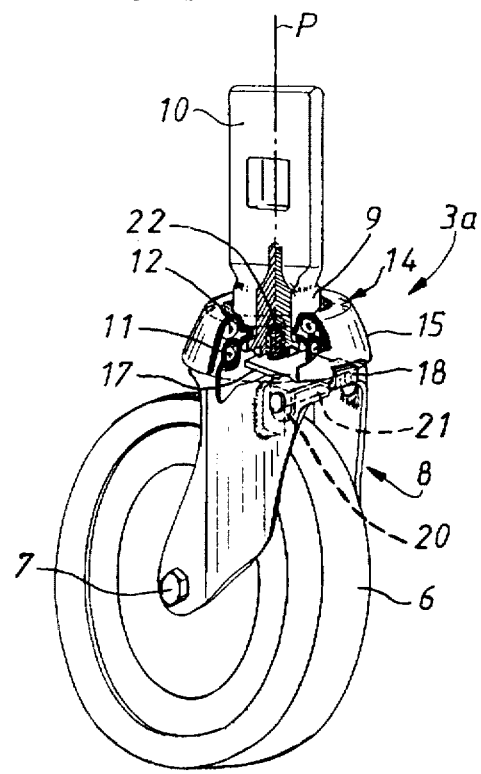
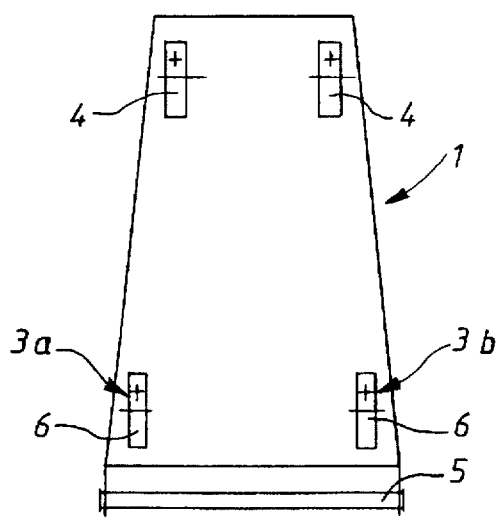
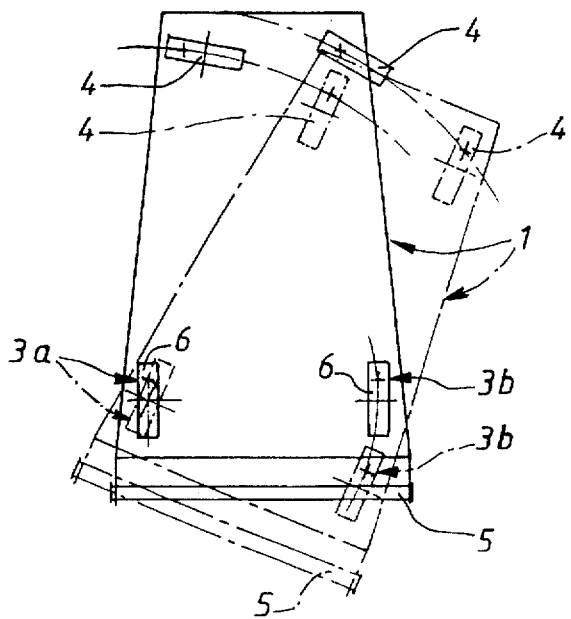
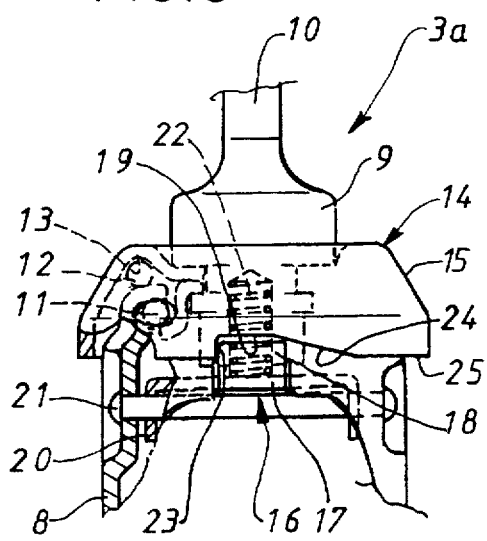

CART INCLUDING A FRAME MOUNTED ON CASTORS AND A CASTOR IN PARTICULAR FOR A CART OF THIS KIND

BACKGROUND OF THE INVENTION

1. Field of the invention

The invention concerns a cart of the kind that includes a frame mounted on castors, at least two castors being provided at a first end of the cart on respective opposite sides of the mean longitudinal axis of the cart.

2. Description of the prior art

Carts of this kind are used in self-service stores by purchasers to transport their purchases or in train stations and airports by passengers to transport their baggage, for example.

If all of the wheels of the cart are castors, the cart can easily be steered but is more difficult to keep moving in a straight line when it is loaded. If the wheels at one end of the cart do not pivot, the cart is easy to keep to a straight line but is more difficult to steer in a confined space.

Attempts have therefore been made to reconcile these two contradictory imperatives. Various solutions have been put forward. U.S. Pat. No. 5,263,266, for example, concerns a castor for a cart including means for locking the castor against pivoting for movement in a straight line, the locking means being selectively engageable. When the locking means are engaged, they prevent pivoting of the castor, for movement in a straight line. The user can disengage the locking means so that the castor pivots, but this requires a movement in the opposite direction to the current direction. The unlocking means include a member that rubs against the castor at all times.

Although it has the advantage of easy movement in a straight line with the castors locked against pivoting, this solution has a number of disadvantages. To disengage the locking means the user must perform an operation that is somewhat impractical, since they must reverse the direction of movement of the cart. Also, the constant rubbing against the castor slows the movement of the cart and causes localized wear of the castor.

The overall aim of the invention is to provide a cart that keeps well to a straight line and steers well without requiring particular maneuvers of the user and in which the castors are not subject to any permanent rubbing.

SUMMARY OF THE INVENTION

The invention consists in a cart including a frame mounted on castors, at least two castors being provided at a first end of said cart on respective opposite sides of a mean longitudinal axis of said cart, each of said castors at said first end including means for locking said castor against pivoting, said locking means of each castor at said first end of said cart acting unidirectionally to allow said castor to pivot freely in one direction by a sufficient amount and to prevent it pivoting in the opposite direction, the locking directions being opposite for said two castors at said first end of said cart on opposite sides of said mean longitudinal axis of said cart.

The castors with unidirectional locking means are preferably the rear castors relative to a normal direction of forward movement of said cart. The rear castors usually pivot about a vertical axis offset to the front of the rotation axis of their wheel and said locking means of each rear castor are adapted to prevent any outward pivoting of said wheel from a normal position of said wheel during forward movement of said cart in a straight line and to allow inward pivoting over at least a sufficient range of angular movement.

The unidirectional locking means of each castor are advantageously adapted to allow complete pivoting of said castor in the permitted direction by one or more turns.

The unidirectional locking means of each castor preferably include a finger pivoted to said castor, disposed above said castor, substantially orthogonal to the direction of said pivot and adapted to engage in a notch in a rim of an inverted cup fixed relative to said frame and disposed above the wheel of said castor, one end of said notch forming an end stop for said finger.

The back of said notch advantageously includes a ramp which, in the direction away from said end stop, descends progressively until it merges with the bottom contour of said rim of said cup and enables passage of said finger. The finger is advantageously hinged on a hinge pin orthogonal to said pivot, at a radial distance from said pivot and between said pivot and said rim of said cup, and spring means are provided to press said finger against the back of said notch.

The spring means advantageously comprise a compression spring coaxial with said pivot and bearing at one end against a fixed part of said frame of said cart and at its other end against the inside of said finger.

In another aspect the invention consists in a castor for carts, in particular for a cart as previously defined, comprising:

a wheel rotating about an axle carried by a yoke;

a pivot orthogonal to and offset relative to the axle of the wheel, said yoke and said wheel being adapted to pivot about said pivot, and locking means for preventing pivoting, wherein said locking means act unidirectionally and are adapted to allow said wheel to pivot freely in one direction over a sufficient amount and to prevent it pivoting in the opposite direction.

The unidirectional locking means of each castor are preferably adapted to enable complete pivoting of the castor in the permitted direction by one or more turns. The unidirectional locking means of each castor comprise a finger pivoted to said castor, disposed above said castor, substantially orthogonal to the direction of said pivot and adapted to engage in a notch in a rim of an inverted cup fixed relative to said pivot and disposed above the wheel of said castor, one end of said notch forming and end stop for said finger. The notch advantageously has a ramp surface as previously defined and the finger is spring-loaded by spring means as previously defined.

In addition to the features referred to above, the invention has a number of other features described in more detail hereinafter relative to a non-limiting embodiment described with reference to the appended drawing.

BRIEF DESCRIPTION OF THE DRAWINGS

FIG. 1 is a perspective view of the bottom part of a cart of the invention.

FIG. 2 is a partly cut away and partly sectioned perspective view to a larger scale of a castor of the invention, corresponding to one of the rear castors of the cart from FIG. 1.

FIG. 3 is a partial front view to a larger scale of the top part of a castor from FIG. 2, with some components sectioned or cut away.

FIG. 4 is a drawing showing rotation of the cart.

DETAILED DESCRIPTION OF THE PREFERRED EMBODIMENT

Referring to the drawing, and in particular to FIG. 1, the bottom part of a cart 1 such as those used in self-service stores includes a frame 2 mounted on castors. At least two castors 3a, 3b are provided at a first end of the carriage, in this example the rear end relative to the normal direction of movement of the carriage. One castor 3a, 3b is provided on each side of the mean vertical longitudinal plane of the cart 1. Two other castors 4 are provided at the front end of the cart.

The cart 1 is designed to be pushed normally by means of a horizontal transverse handlebar 5 at the top and at the rear of the cart (FIG. 4). The expressions "rear" and "front" as used in this description are relative to the direction of movement obtained when the cart is pushed by means of the handlebar 5. It is nevertheless clear that the cart 1 can be pulled by means of the handlebar 5, rather than pushed, the direction of movement of the cart being then the opposite of its normal direction of movement.

The castor 3a is on the lefthand side of the cart, relative to the normal direction of movement, and the castor 3b is on the righthand side. The following description refers to the castor 3a. The description of the castor 3b is deducible from this, as explained below.

The castor 3a includes a wheel 6 mounted to rotate about an axle 7 carried by a yoke 8 with two flanges capping the wheel 6. The yoke 8 turns about a pivot 9 attached to a lug 10 for fixing it to the frame of the cart 1. The geometrical axis P of the pivot is the pivot axis.

The yoke 8 is rotatably mounted on the fixed pivot 9 by means of two ball bearings 11, 12. The top ball bearing 12 is housed in a groove 13 forming a rolling way in the bottom of an inverted cup 14 fixed to the pivot 9. The cup 14 has a downwardly extending rim 15. The geometrical axis of the pivot 9 is orthogonal to and offset from the axle 7. The yoke 8 and the wheel can pivot about the pivot 9. When the cart is rolling on a horizontal surface the pivot 9 is vertical and the axle 7 is horizontal.

The castor 3a of the invention includes unidirectional pivot locking means 16 adapted to allow the wheel 6 to pivot an adequate amount in one direction and to prevent it pivoting in the other direction.

As can be seen in FIGS. 2 and 3, the locking means 16 for locking the wheel 6 include a finger 17 pivoted to the yoke 8 and therefore to the wheel 6 and disposed above the wheel. The finger 17 is formed by a kind of blade member extending under and substantially orthogonally to the pivot 9, the radially outermost end of the blade member 17 being bent upwards at 90° to form a lug 18 adapted to engage in a notch 19 in the rim 15 of the cup 14.

The finger 17 has two transverse extensions slightly set back in the radial direction from the lug 18 and having at their end a downwardly bent lug 20 near the inside surface of one flange of the yoke 8. A hinge pin 21 parallel to the axle 7 passes through respective holes in the flanges of the yoke 8 and in the lugs 20.

Spring means in the form of a compression spring 22 are provided to press the lug 18 of the finger against the back of the notch 19. The spring 22 is advantageously coaxial with the pivot 9 in a blind hole opening onto the bottom transverse face of the pivot 9. The top end of the spring 22 bears against the back of the blind hole, i.e. against the pivot 9 fixed to the frame of the cart; the other end, i.e. the bottom end of the spring 22 bears against the interior of the finger 17. It can be seen that the spring 22 tends to raise the lug 18 by pivoting it about the pin 21.

One end 23 of the notch 19 forms an end stop for the finger 17. This end 23 is a vertical edge adapted to cooperate with a conjugate vertical edge of the lug 18 so that the force retaining the finger 17, via the cup 14, does not produce any vertically downward component tending to lower the finger 17.

Towards the other end, the back of the notch 19 includes a ramp 24 which, in the direction away from the end stop 23, descends progressively until it merges with the bottom contour 25 of the rim of the cup 14.

Accordingly, the yoke 8 and the wheel 6 can turn in the direction in which the lug 18 comes to bear against the ramp 24. This results in progressive lowering of the outside end of the finger 17 until it comes into contact with the bottom edge 25. The wheel 6 can continue to pivot through one complete turn, the lug 18 again entering the notch 19, due to the action of the spring 22, when it has passed completely beyond the end 23. The wheel 6 can therefore turn several times in the permitted direction.

In the example shown in FIGS. 2 and 3 the notch 19 is on the front side of the cup 14 and the end stop 23 for the right rear wheel 6 is at the lefthand end of the notch 19, as seen in FIG. 3, i.e. at the inner end of the notch.

In the normal direction of movement, the axle 7 is to the rear of the pivot 9 so that in the example shown the locking effect of the end stop 23 prevents outward pivoting of the yoke 8 and of the wheel 6, which would correspond to a displacement of the lug 18 towards the left in FIG. 3. The wheel 6 can pivot towards the inside, however, which corresponds to a displacement of the lug 18 towards the right in FIG. 3, encountering the ramp 24.

The other castor 3b is adapted so that the right rear wheel 6 can pivot inwards and is prevented from pivoting outwards. This is achieved at the level of the cup 14 of the other castor 3b by a notch 19 facing in the opposite direction to that shown in FIG. 3, in other words, as seen from the front, the end stop 23 for the castor 3b is on the right and the ramp 24 is on the left of the lug 18 of the finger. The other components of the castor 3b are similar to those described with reference to FIG. 3.

The cart of the invention works as follows.

When the user pushes the cart 1 in a straight line the rear castors 3a, 3b assume their straight line forward movement position in which the lug 18 of the finger 17 associated with the wheel locates in the notch 19, bearing against the end stop 23. The wheel 6 does not diverge from this position because on one side it is completely immobilized by the end stop 23 and on the other side the conjugate action of the ramp 24 and the spring 22 operating on the lever 17 return the wheel to the straight line forward movement position; this action is combined with the effect of the rake angle of the castor.

Accordingly, the cart 1 moves correctly forward in a straight line, even if the cart is heavily loaded.

When the user wishes to steer the cart 5, for example towards the left as shown in FIG. 4, the right rear wheel can pivot inwards to facilitate the turning movement of the cart without the user having to perform any maneuver to allow the pivoting of the right rear wheel. Where the user moves the cart 1 in the opposite direction to normal, i.e. by pulling on the handlebar 5, the wheels 6 can pivot through one half-turn to become the front castors, enabling satisfactory movement of the cart in the opposite direction to normal.

There is claimed:

1. Cart including a frame mounted on castors, at least two castors being provided at a first end of said cart on respective opposite sides of a mean longitudinal axis of said cart, each of said castors at said first end including means for locking said castor against pivoting, said locking means of each castor at said first end of said cart acting unidirectionally to allow said castor to pivot freely in one direction by a sufficient amount and to prevent it from pivoting in the opposite direction, the locking directions being opposite for said two castors at said first end of said cart on opposite sides of said mean longitudinal axis of said cart.

2. Cart according to claim 1 wherein said castors with unidirectional locking means are the rear castors relative to a normal direction of forward movement of said cart.

3. Cart according to claim 2 wherein each rear castor pivots about a vertical axis offset to the front of the rotation axis of its wheel and said locking means of each rear castor are adapted to prevent any outward pivoting of said wheel from a normal position of said wheel during forward movement of said cart in a straight line and to allow inward pivoting over at least a sufficient range of angular movement.

4. Cart according to claim 1 wherein said unidirectional locking means of each castor are adapted to allow complete pivoting of said castor in the permitted direction by one or more turns.

5. Cart according to claim 1 wherein said unidirectional locking means of each castor include a finger pivoted to said castor, disposed above said castor, substantially orthogonal to the direction of said pivot and adapted to engage in a notch in a rim of an inverted cup fixed relative to said frame and disposed above the wheel of said castor, one end of said notch forming an end stop for said finger.

6. Cart according to claim 5 wherein the back of said notch includes a ramp which, in the direction away from said end stop, descends progressively until it merges with the bottom contour of said rim of said cup and enables passage of said finger.

7. Cart according to claim 6 wherein said finger is hinged on a hinge pin orthogonal to said pivot, at a radial distance from said pivot and between said pivot and said rim of said cup, and spring means are provided to press said finger against the back of said notch.

8. Cart according to claim 7 wherein said spring means comprise a compression spring coaxial with said pivot and bearing at one end against a fixed part of said frame of said cart and at its other end against the inside of said finger.

9. Castor for carts, comprising:

a wheel rotating about an axle carried by a yoke;

a pivot orthogonal to and offset relative to said axle of said wheel, said yoke and said wheel being adapted to pivot about said pivot, and locking means for preventing pivoting, wherein said locking means act unidirectionally and are adapted to allow said wheel to pivot freely in one direction over a sufficient amount and to prevent it from pivoting in the in the opposite direction.

10. Castor according to claim 9 wherein said unidirectional locking means of said castor are adapted to enable complete pivoting of the castor in the permitted direction by one or more turns.

11. Castor according to claim 9 wherein said unidirectional locking means of said castor include a finger pivoted to said castor, disposed above said castor substantially orthogonal to the direction of said pivot and adapted to engage in a notch in a rim of an inverted cup fixed relative to said pivot and disposed above the wheel of said castor, one end of said notch forming an end stop for said finger.

12. Castor according to claim 11 wherein said notch has a back which includes a ramp which, in the direction away from said end stop, descends progressively until it merges with a bottom contour of said rim of said cup and enables passage of said finger.

13. Castor according to claim 11 wherein said finger is hinged on a pin orthogonal to the direction of said pivot, at a radial distance from said pivot and between said pivot and said rim of said cup, and spring means are provided to press said finger against the back of said notch.

14. Castor according to claim 13 wherein said spring means comprise a compression spring coaxial with said pivot and bearing at one end against a fixed part of said frame of said cart and at its other end against an inside portion of the finger.

* * * * *